United States Patent
Attaluri et al.

(10) Patent No.: US 10,133,760 B2
(45) Date of Patent: Nov. 20, 2018

(54) HARDWARE FOR A BITMAP DATA STRUCTURE FOR EFFICIENT STORAGE OF HETEROGENEOUS LISTS

(71) Applicant: International Business Machines Corporation, Armonk, NY (US)

(72) Inventors: Gopi K. Attaluri, San Jose, CA (US); Ronald J. Barber, San Jose, CA (US); Vincent Kulandaisamy, Portland, OR (US); Vijayshankar Raman, Sunnyvale, CA (US); Richard S. Sidle, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 376 days.

(21) Appl. No.: 14/595,152

(22) Filed: Jan. 12, 2015

(65) Prior Publication Data

US 2016/0203172 A1 Jul. 14, 2016

(51) Int. Cl.
*G06F 17/30* (2006.01)
*G06F 11/14* (2006.01)

(52) U.S. Cl.
CPC .... *G06F 17/30324* (2013.01); *G06F 11/1435* (2013.01); *G06F 2201/80* (2013.01); *G06F 2201/84* (2013.01)

(58) Field of Classification Search
None
See application file for complete search history.

(56) References Cited

U.S. PATENT DOCUMENTS

| | | | | |
|---|---|---|---|---|
| 5,029,069 A * | 7/1991 | Sakamura | ........... | G06F 9/30094 708/525 |
| 5,819,256 A | 10/1998 | Ozbutun et al. | | |
| 5,826,268 A * | 10/1998 | Schaefer | ........... | G06F 17/30607 |
| 6,278,992 B1 * | 8/2001 | Curtis | ............... | G06F 17/30324 707/711 |
| 6,470,490 B1 * | 10/2002 | Hansen | ............. | G06F 17/30324 707/999.101 |
| 6,697,363 B1 * | 2/2004 | Carr | .................... | H04L 45/7457 370/389 |
| 7,305,383 B1 | 12/2007 | Kubesh et al. | | |
| 7,689,630 B1 | 3/2010 | Lam | | |
| 8,370,274 B2 * | 2/2013 | Cassetti | .................... | G06F 7/02 706/12 |
| 8,655,911 B2 | 2/2014 | Li et al. | | |
| 2003/0135495 A1 * | 7/2003 | Vagnozzi | .......... | G06F 17/30324 |

(Continued)

OTHER PUBLICATIONS

International Search Report and Written Opinion dated Mar. 29, 2016 for International Application No. PCT/EP2016/050177 from International Searching Authority, pp. 1-10, European Patent Office, Rijswijk, Netherlands.

(Continued)

*Primary Examiner* — Neveen Abel Jalil
*Assistant Examiner* — Katriel Y Chiu
(74) *Attorney, Agent, or Firm* — Sherman IP LLP; Kenneth L. Sherman; Steven Laut

(57) ABSTRACT

A hardware accelerator includes a bitmap processor that processes a bitmap structure for multiple list population. A population count processor processes population counts for data and aggregates the population counts. The bitmap data structure includes bitmap bit fields interleaved with aggregated population count fields.

17 Claims, 7 Drawing Sheets

(56) References Cited

U.S. PATENT DOCUMENTS

| | | | |
|---|---|---|---|
| 2008/0071781 A1* | 3/2008 | Ninan | G06F 17/30495 |
| 2009/0115576 A1* | 5/2009 | Schuessler | G06F 17/30324 |
| | | | 340/10.1 |
| 2010/0115233 A1 | 5/2010 | Brewer et al. | |
| 2010/0199036 A1* | 8/2010 | Siewert | G06F 3/0613 |
| | | | 711/112 |
| 2010/0306263 A1* | 12/2010 | Cassetti | G06F 7/02 |
| | | | 707/776 |
| 2011/0072241 A1* | 3/2011 | Chen | G06F 9/3004 |
| | | | 712/202 |
| 2011/0145835 A1* | 6/2011 | Rodrigues | G06F 9/526 |
| | | | 719/312 |
| 2014/0006381 A1 | 1/2014 | Barber et al. | |
| 2014/0137119 A1 | 5/2014 | Hyde et al. | |
| 2014/0201129 A1* | 7/2014 | Gupta | G06F 17/30592 |
| | | | 707/602 |
| 2014/0214794 A1* | 7/2014 | Attaluri | G06F 17/30466 |
| | | | 707/714 |
| 2014/0214855 A1 | 7/2014 | Attaluri et al. | |
| 2014/0229680 A1 | 8/2014 | Solihin | |

OTHER PUBLICATIONS

Zhou, D. et al., "Space-Efficient, High-Performance Rank & Select Structures on Uncompressed Bit Sequences", Proceedings of the 12th International Symposium on Experimental Algorithms (SEA 2013), Jun. 2013, pp. 151-163, Rome, Italy.

Farinacci, D. et al., "Population Count Extensions to Protocol Independent Multicast (PIM) (RFC6807)", Internet Engineering Task Force, Dec. 1, 2012, pp. 1-31, IP.COM, United States.

* cited by examiner

FIG. 4

| 410 | 420 | 411 | 421 | 412 | 422 | |
|---|---|---|---|---|---|---|
| Population Count Aggregation 16 Bit | Bitmap Bits 48 Bit | Population Count Aggregation 16 Bit | Bitmap Bits 48 Bit | Population Count Aggregation 16 Bit | Bitmap Bits 48 Bit | ... |

| 510 | 520 | 511 | 521 |
|---|---|---|---|
| Population Count Aggregation 4 | Bitmap Bits 00101101 | Population Count Aggregation 9 | Bitmap Bits 10100111 |

400

HARDWARE FOR A BITMAP DATA STRUCTURE FOR EFFICIENT STORAGE OF HETEROGENEOUS LISTS

BACKGROUND

Embodiments of the invention relate to bitmaps, in particular, for providing a hardware realization of a bitmap data structure that supports efficient population counting.

It is common in computer programs to have a list of heterogeneous items, where each item is represented in one of a small number of formats. But such lists are hard to maintain in a compact fashion.

BRIEF SUMMARY

Embodiments of the invention relate to providing a hardware realization of a bitmap data structure that supports efficient population counting. One embodiment includes a hardware accelerator that includes a bitmap processor that processes a bitmap structure for multiple list population. A population count processor processes population counts for data and aggregates the population counts. The bitmap data structure includes bitmap bit fields interleaved with aggregated population count fields.

These and other features, aspects and advantages of the present invention will become understood with reference to the following description, appended claims and accompanying figures.

BRIEF DESCRIPTION OF THE SEVERAL VIEWS OF THE DRAWINGS

FIG. 4 illustrates a lookup bitmap layout, according to an embodiment.

FIG. 5 illustrates a simplified example for a bitmap with the layout as shown in FIG. 4, according to an embodiment.

DETAILED DESCRIPTION

Aspects of the present invention are described below with reference to flowchart illustrations and/or block diagrams of methods, apparatus (systems), and computer program products, according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Figure 1:
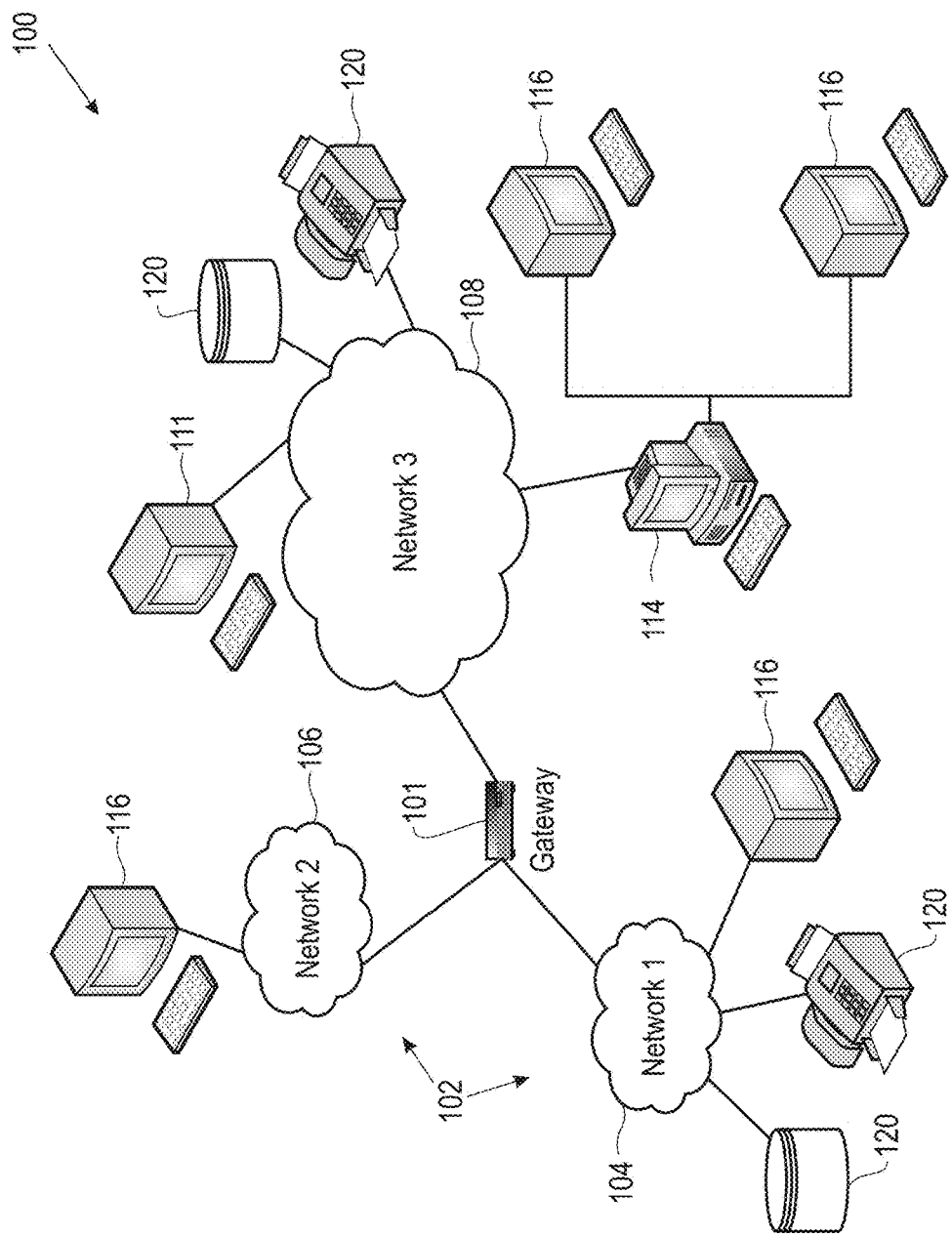
FIG. 1 is a network architecture for storing and recovering data for fast durability and quick journal-less recovery, according to an embodiment of the present invention.

FIG. 1 illustrates a network architecture 100, in accordance with one embodiment. As shown in FIG. 1, a plurality of remote networks 102 are provided, including a first remote network 104 and a second remote network 106. A gateway 101 may be coupled between the remote networks 102 and a proximate network 108. In the context of the present network architecture 100, the networks 104, 106 may each take any form including, but not limited to, a LAN, a WAN, such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems, which emulate one or more other systems, such as a UNIX system that emulates an IBM z/OS environment, a UNIX system that virtually hosts a MICROSOFT WINDOWS environment, a MICROSOFT WINDOWS system that emulates an IBM z/OS environment, etc. This virtualization and/or emulation may be implemented through the use of VMWARE software in some embodiments.

In other examples, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, therefore allowing access and distribution of services across many computing systems. Cloud computing typically involves an Internet connection between the systems operating in the cloud, but other techniques of connecting the systems may also be used, as known in the art.

In one or more embodiments, the system 100 utilizes a process for using a bitmap data structure that supports efficient population counting, and a hardware realization of it. Some embodiments include a method that uses the bitmap data structure for maintaining heterogeneous lists of items. One embodiment includes a hardware accelerator including a bitmap processor that processes a bitmap structure for multiple list population and a population count processor that processes population counts for data and aggregates the population counts. In one embodiment, the bitmap data structure includes bitmap bit fields interleaved with aggregated population count fields.

Figure 2:
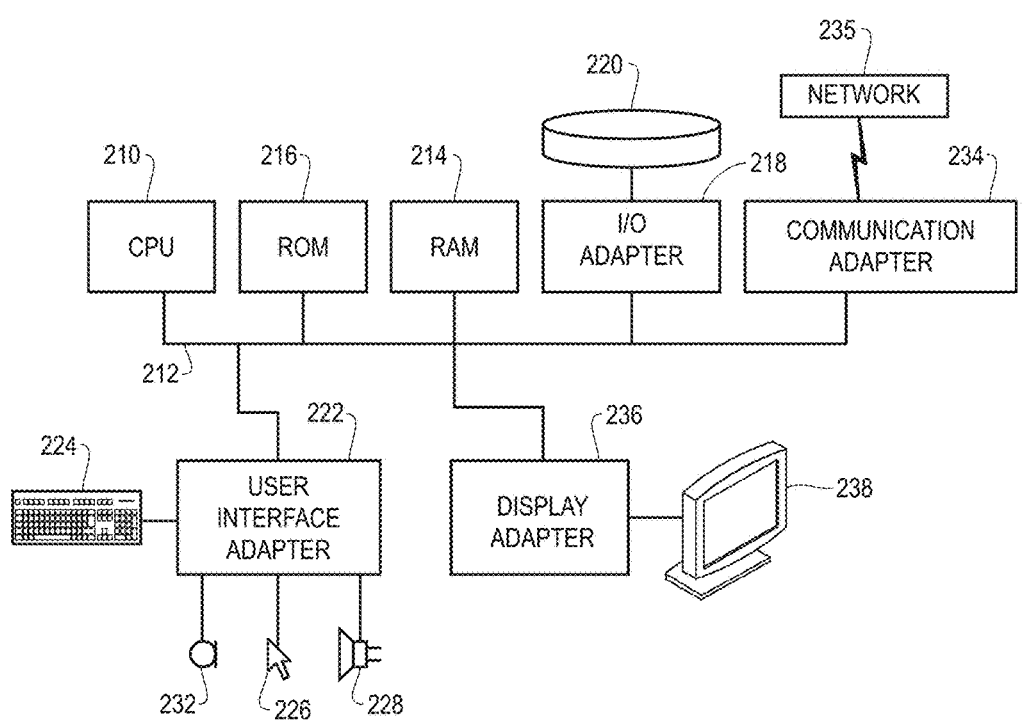
FIG. 2 shows a representative hardware environment that may be associated with the servers and/or clients of FIG. 1, according to an embodiment.

FIG. 2 shows a representative hardware environment associated with a user device 116 and/or server 114 of FIG. 1, in accordance with one embodiment. In one example, a hardware configuration includes a workstation having a central processing unit 210, such as a microprocessor, and a number of other units interconnected via a system bus 212. The workstation shown in FIG. 2 may include a Random Access Memory (RAM) 214, Read Only Memory (ROM) 216, an I/O adapter 218 for connecting peripheral devices, such as disk storage units 220 to the bus 212, a user interface adapter 222 for connecting a keyboard 224, a mouse 226, a speaker 228, a microphone 232, and/or other user interface devices, such as a touch screen, a digital camera (not shown), etc., to the bus 212, communication adapter 234 for connecting the workstation to a communication network 235 (e.g., a data processing network) and a display adapter 236 for connecting the bus 212 to a display device 238.

In one example, the workstation may have resident thereon an operating system, such as the MICROSOFT WINDOWS Operating System (OS), a MAC OS, a UNIX OS, etc. It will be appreciated that other examples may also be implemented on platforms and operating systems other than those mentioned. Such other examples may include operating systems written using JAVA, XML, C, and/or C++ language, or other programming languages, along with an object oriented programming methodology. Object oriented programming (OOP), which has become increasingly used to develop complex applications, may also be used.

A bitmap is a mapping from some domain (e.g., a range of integers) to bits having a value of zero or one. A bitmap may also be known as a bit array or bitmap index. Some conventional methods for generating a list of items may be having a list of pointers. However, for a list of pointers, the computational costs involve paying for an extra indirection and cache miss each access time. Additionally, a list of pointers waste space for the pointers. Another conventional method relates to processing lists of items, with holes. For example, suppose list items are A, B, c, d, E, f, B, G where capital letters are one format and lower case letters are another format. In this conventional technique one would have two homogeneous lists: (A, B, gap, gap, E, gap, B, G) and (gap, gap, c, d, gap, f, gap, gap). Another example includes processing lists of items, without holes. For example, suppose the items are A, B, c, d, E, f, B, G where capital letters are one format and lower case letters are another format, as above. In this conventional processing technique, one would have two lists: (A, B, E, B, G) and (c, d, f), and a conventional bitmap 00110100 indicating that the first two entries are from the first list, the third and fourth are from the second list, and so on. This conventional technique, however, is efficient space-wise, but accesses have to pay computational costs for an expensive population count in the case of long lists.

One or more embodiments include a system and method for using a bitmap structure for efficient storage of heterogeneous lists, where the bitmap data structure includes an array of bits, with periodically interleaved pre-computed population counts. In one embodiment, the bitmap is represented as a sequence—some number of bits, followed by a population count (e.g., the number of particular bits (e.g., 1-bits) up to that location), some more bits, another population count, and so on. The population augmented bitmap is employed as a hardware accelerator with the data structure and instructions (e.g., micro-instructions) needed to implement it in hardware. In one embodiment, the bitmap data structure has interleaved population counts with a single fixed size array (e.g., sized to the size of a page), with the two lists populated from opposite ends of the array. One or more embodiments may use the bitmap data structure for maintaining heterogeneous lists of items.

Figure 3:
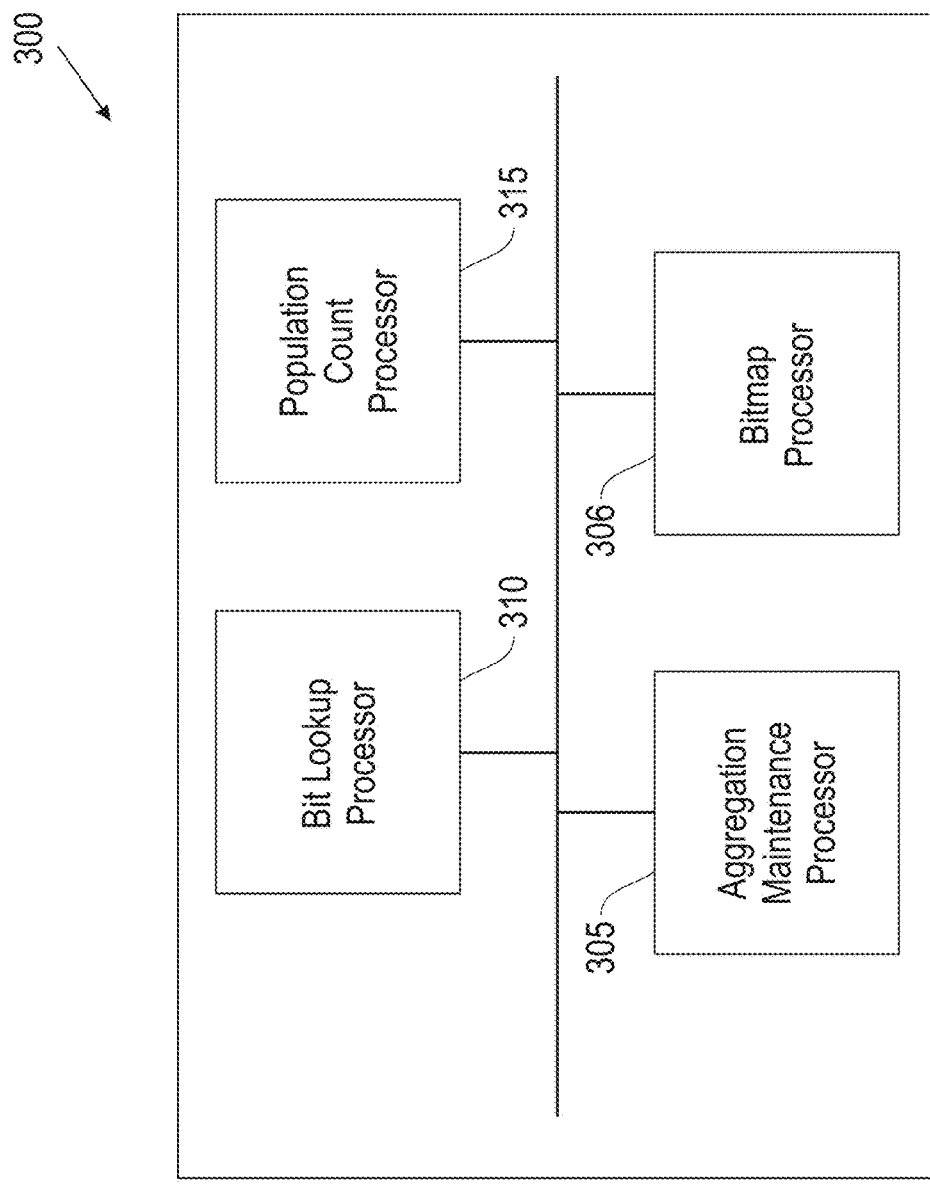
FIG. 3 illustrates an example block diagram of a processing architecture according to an embodiment.

FIG. 3 illustrates an example block diagram of a processing architecture 300 according to an embodiment. In one embodiment, the architecture 300 may be provided in hardware, such as circuitry (e.g., an application specific integrated circuit (ASIC), filed-programmable gate array, FPGA, etc.). In one embodiment, the architecture 300 includes an aggregation maintenance processor 305, a bitmap processor 306, a bit lookup processor 310, and a population count processor 315. In one embodiment, the bitmap processor 306 generates a bitmap data structure which involves an array of bits, with periodically interleaved pre-computed population counts. In one embodiment, the interleaving in the bitmap structure provides for an efficient calculation, given any bit-position in the bitmap, the number of particular bits (e.g., 1-bits or 0-bits, depending on the implementation) up to that bit. In one embodiment, the bitmap processor 306 may use the following process using the bitmap structure: (a) find the closest pre-computed population count from the population count processor 315 to the bit position desired to access using the bit lookup processor 310; and (b) add to that a pre-computed population count, an aggregated population count (from the aggregation maintenance processor 305) of the number of particular bits (e.g., 1-bits) from that pre-computed position, to the bit position being accessed. In one embodiment, a benefit of using this technique that an exact population count is computed with only one cache-line memory access.

In one embodiment, the bitmap processor 306 uses the bitmap to store heterogeneous lists. In one embodiment, the heterogeneous lists are stored as separate homogeneous lists, and the bitmap structure is used to indicate into which format each item (in sequence) goes. For example, suppose we want to store a list of items: A, B, c, d, E, f, B, G where capital letters are one format and lower case letters are another format. In one embodiment, this is represented with two lists: (A, B, E, B, G) and (c, d, f), and a bitmap 0011 (population count of 1's so far=2) 0100 (population count of particular bits (e.g., 1-bits) so far=3). In the bitmap data structure of this example, a population count is embedded after every 4th bit. The population count is the number of particular bits (e.g., 1-bits) up to then, from the start of the bitmap. The bits in the bitmap in this example are 0011 0100. The first two bits are 0, meaning that they belong to the uppercase format list. The next two are 1, meaning they belong to the lowercase format list, and so on.

In one embodiment, the population count based bitmap is used as a hardware 'accelerator,' with both the bitmap data structure and instructions to access it implemented in hardware. In one embodiment, the bitmap data structure and instructions may be extended to hold more than two heterogeneous formats by using more than a single bit per entry. In one embodiment, the hardware instructions may be the following: (1) define a bit lookup region passing an address and maximum number of values to store, and returning bytes needed; (2) append to the bit lookup region passing a bit value and maintaining a population count aggregate on a last word of the bitmap structure; (3) insert into the bit lookup region passing an offset and bit value invalidating all population counts aggregate after the insert location and triggering aggregation maintenance on the next lookup; and (4) lookup entries in the region by offset—this accesses both the bits and the population counts. In another embodiment, an alternative to the instructions in (3) may be including an explicit instruction or command that must be called to explicitly correct or "fix-up" the aggregates.

FIG. 4 illustrates a lookup bitmap 400 layout, according to an embodiment. In one embodiment, the bitmap 400 includes fields for population count aggregation 410 and bitmap bits 420, which repeat sequentially. In one example, every 64-bit word of the bitmap 400 has a 16-bit population count (e.g., population count aggregation 410, 411, 412, etc.) and a 48-bit bitmap (e.g., bitmap bits 420, 421, 422, etc.). In one embodiment, the worst case number of bits needed for the population count aggregation is ceiling(log2 (list-entries)). In one example, having this number provided as a multiple of 8 allows standard processor instructions to extract the number. Through bit manipulation or hardware support, however, the aggregation size may be any particular bit width and may potentially be variable depending on offset such that earlier aggregations are fewer bits as the maximum number they may hold would be smaller. In another example embodiment, 80-bit "words" may be used with a 64-bit bitmap and a 16-bit aggregation, which has the benefit of an inexpensive division instruction via a shift and then a "cheap" multiply and at the computational cost of periodic cache line straddling. In one embodiment, the decision on the number of bits for the bitmap 400 per aggregation roll-up depends on several factors, such as: desire to avoid straddling cache lines, largest efficient internal pop-count instruction, and cost of computing bit offset to test. One challenge may be that access to elements of the bitmap 400 involves integer division. For example, with a 16-bit population count and 48-bit bitmap 400 split in each 64-bit word, accessing the i'th entry involves accessing the jth bit of the bitmap 400, where j=(i/48)*64+16+(i %48) and % is the modulo function. In one embodiment, known techniques may be applied for fast integer division, including if needed, storing a pre-computed modular inverse in the bitmap 400 itself.

FIG. 5 illustrates a simplified example for a bitmap 400 with the layout as shown in FIG. 1, according to an embodiment. In one embodiment, the simplified layout 400 holds 16 bits. In the example bitmap 400, the population count aggregation 510 is 4, the bitmap bits 520 is "00101101," the population count aggregation 511 is 9, and the bitmap bits 521 is "10100111." Sometimes it is useful to have a data structure to be embedded in a single array, instead of in multiple separate lists and bitmaps. For example, data that needs to be persistent has to be stored in pages, and so breaking up a list of objects into separate lists does not work. In one embodiment, the bitmap 400 has a single fixed size array (e.g., sized to the size of a memory page), with the two lists populated from opposite ends of the array. This storage allows efficient inserts, without any buffering. When a new value is inserted, one embodiment checks the format, and accordingly inserts it in the appropriate list—there is no need to know up-front the number of items in each format to choose the starting offsets of the arrays. In one embodiment, the bitmap is stored in the beginning, and is sized to (size of array)/(size of the shorter/smaller format) number of bits (see, e.g., FIG. 6, array of format 1 objects 610). In one embodiment, when the array (page) fills up, a new page is started. In one embodiment, the data structure may be viewed as a list of pages (other embodiments may include having pages of increasing size).

Figure 6:
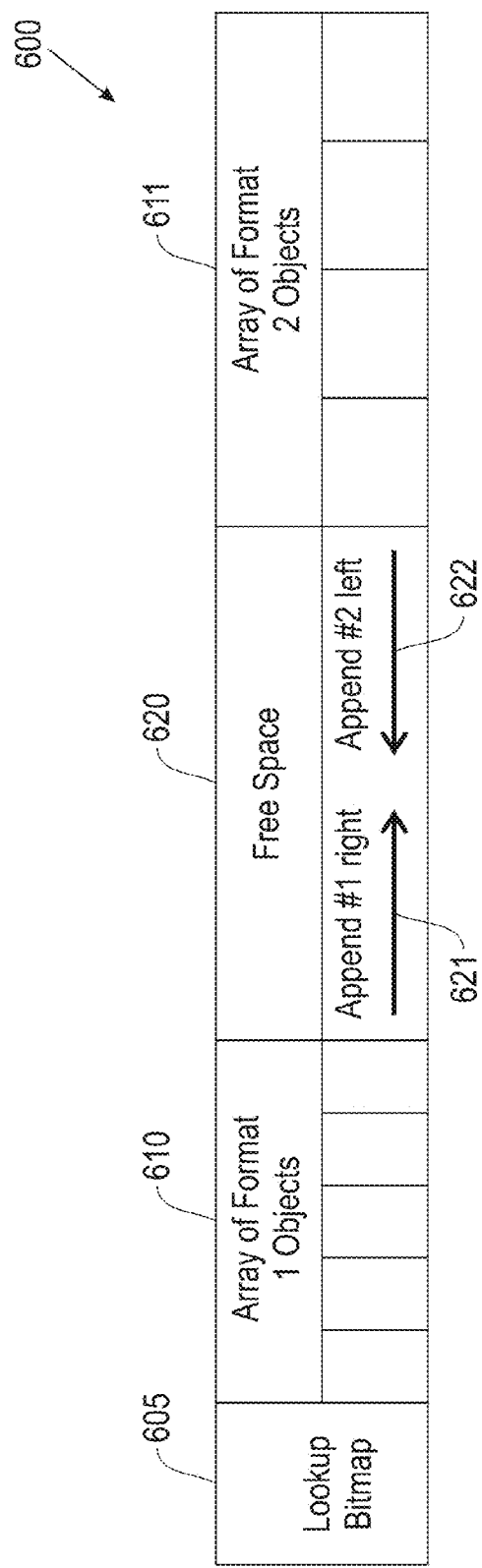
FIG. 6 illustrates an example of a bi-format container using the lookup bitmap data structure, according to an embodiment.

FIG. 6 illustrates an example of a bi-format container 600 using the lookup bitmap data structure, according to an embodiment. In one embodiment, the container 600 includes fields for a lookup bitmap 605, array of format 1 objects 610, free space 620 and array of format 2 objects 611. In one embodiment, in the free space field 620, the two lists populated from opposite ends of the array (e.g., append #1 list right 621, and append #2 list left 622). In one embodiment, the bitmap structure provides storage that allows efficient inserts without any buffering required. When a new value is inserted, the format is checked and inserted into the appropriate list. As described above, the bitmap (e.g., bitmap 400) is stored in the beginning, and is sized as: (size of array)/(size of the shorter format) number of bits. In one embodiment, the array of format 1 objects 610 is shorter than the array of format 2 objects 611. In one embodiment, the container 600 may be supported in the instruction set (e.g., microcode or hardware). In one example embodiment, the instructions may be: (1) form a container, giving the number of possible formats and also possibly their widths; (2) append entries to the container; and (3) lookup entries in the container by offset.

In one embodiment, an example instruction set for accessing the bitmap 400 may be as follows:
1. GetBitmapSize(TotalBits)->Returns Bytes—This instruction computes needed storage for a bitmap of a specified number of bits.
2. UpdateBitmapBit(BitmapStart, BitOffset, BitValue)—This instruction updates the bit value at BitOffset to be BitValue. This instruction may additionally or optionally have SetBitmapBit(BitmapStart, BitOffset) and ClearBitmapBit(BitmapStart, BitOffset) that uses 1 and 0 as the BitValue respectively.
3. TestBitmapBit(BitmapStart, BitOffset)—Returns Zero/NotZero flag or 0/1.
4. GetPopulationCount(BitmapStart, BitOffset)—Returns the number of 1 bits up to BitOffset. This instruction leverages the interleaved aggregations, and returns the population count up to the specified offset with only one cache line access.
5. RefreshBitmap(BitmapStart, TotalBits)—This is an explicit instruction to maintain the aggregations if an automatic invalidation and triggering scheme is not used. Bitmap accelerator users must call this after the bitmap changes before performing GetPopulationCount calls.
6. GetBitmapOffset(BitmapStart, BitPopulationCount, BitValue)—Returns the offset of the specified population count of bits (e.g., 1 or 0 bits). This is an optional instruction that allows "reverse lookup" for the Nth bit (e.g., 0 or 1) in the base bitmap. Implementation requires a binary or linear search of aggregated population count to first find a value and then by processing of the last bitmap bits.

Figure 7:
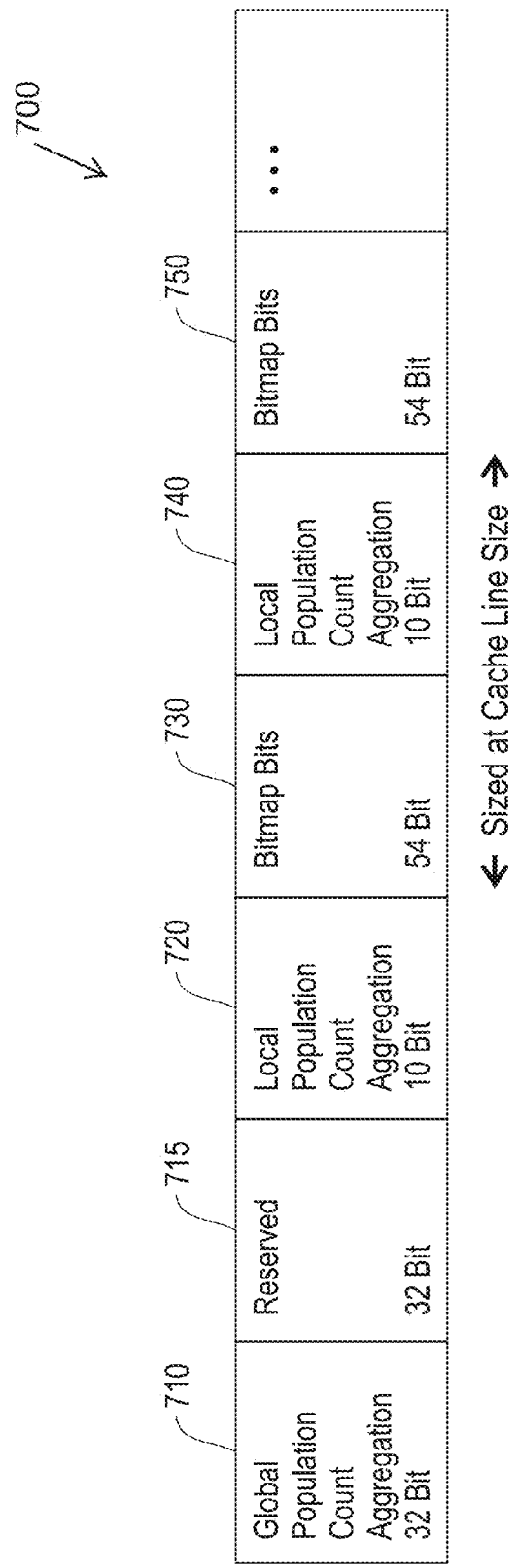
FIG. 7 illustrates another bitmap data structure, according to an embodiment.

FIG. 7 illustrates a bitmap data structure 700, according to one embodiment. In one embodiment, the bitmap data structure 700 includes fields for global population count aggregation 710 (32 bit), reserved section 715 (32-bit), local population count aggregation 720 (10-bit), bitmap bits 730 (54 bit), local population count aggregation 740 (10-bit), and bitmap bits 750 (54-bit). In one embodiment, the lookup bitmap data structure 700 exploits cache line sizes more than the lookup bitmap 400 layout (FIG. 4) if the bitmap structure placement can be guaranteed aligned. In one embodiment, the format of the bitmap data structure 700 maintains a 32-bit global population count aggregation 710 (allowing for bitmaps up to 4B bits) once per cache line sized number of bytes with reserved bits 715 positioned to an appropriate alignment for the repeated local population count/bitmap bits pairs. In one embodiment, the global population count aggregation is cumulative and counts the number of bits (e.g., 0 or 1 bits) from the beginning up to the current location. In one embodiment, the pairs include the local population count aggregations 720 and 740, each with 10-bit aggregation, to allow for nearly 1024 bits of a 128-byte cache line and a 54-bit bitmap that are sized to accommodate current hardware population count instructions. The bitmap data structure 700 allows for 64-bit values, and may be sized larger if an efficient instruction/microcode exists for longer bitmap runs. In one example, with a 128-byte cache line, fifteen (15) pairs would be supported.

In one example embodiment, bit lookups in the bitmap data structure 700 involve a determination of a bit offset such as: Bit-Offset=(Req-Bit/(15*54))*(128*8)+((Req-Bit %(15*54))/54)*64+744+(Req-Bit %54), which may be efficiently implemented in hardware. The prefix population count lookups in the bitmap data structure 700 would need a single cache line to be brought into a processor and takes the sum of three (3) elements: the global population count at the start of the cache line, the local population count in a segment pair containing a bit in question, and the negation of the number of one (1) bits from the requested bit to the end pair element, found using a mask and a population count instruction.

In one example, updating bits within the bitmap data structure 700 may have several behaviors, such as adjusting the global and local population counts to allow a Refresh-Bitmap instruction to only maintain the global population count aggregations, which would only need to read the last local population count aggregation per-cache line.

Figure 8:
FIG. 8 illustrates a block diagram showing a process for using a bitmap structure as a hardware accelerator, in accordance with an embodiment of the invention.

FIG. 8 illustrates a block diagram showing a process 800 for using a bitmap structure as a hardware accelerator. In one embodiment, in block 810 process 800 includes defining a bit lookup region for passing an address and a maximum number of values to store, and for returning bytes needed. In one embodiment, in block 820, process 800 includes appending to the bit lookup region by passing a bit value and maintaining a population count aggregate on a last word of a bitmap structure that comprises bitmap bit fields interleaved with aggregated population count fields. In one embodiment, in block 830 process 800 includes inserting into the bit lookup region by passing an offset and a bit value for invalidating all aggregate population counts after an insert location. In one embodiment, in block 840 process 800 includes triggering aggregation maintenance on a next bit lookup or based on an explicit instruction.

In one embodiment, process 800 may further include looking up entries in the bit lookup region by using an offset for accessing both the bitmap bits and the population counts. In one embodiment, the data structure stores a global list of objects of multiple formats using a first field including a first local list of objects, and a second field including a second local list of objects. In one embodiment, bitmap bits in the bitmap bit fields indicate for each element in the global list which of the first local list and the second local list it belongs to.

In one embodiment each local list has objects in a single format, the population counts are pre-computed, and the bitmap structure is represented as a repeated sequence of an aggregated population count field adjacent to a bitmap bit field. In one embodiment, the interleaved population count fields include a single fixed size array, and the first local list and the second local list are populated with objects from opposite ends of the single fixed size array.

In one embodiment, process 800 may further include determining a closest pre-computed population count to a bit position selected for access, and adding to the determined closest pre-computed population count a population count of a number of particular bits from a position of the closest determined pre-computed population count, to the bit position selected for access.

In one embodiment, process 800 may further include forming a container based on a number of formats, appending entries to the container, and looking up entries in the container by using an offset.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A hardware accelerator comprising:
    at least one processor; and
    a non-transitory processor-readable memory device storing instructions that when executed by the at least one processor causes the at least one processor to perform operations including:
        generating and processing a bitmap data structure, wherein the bitmap data structure comprises information for multiple heterogenous lists including a first list of objects in a first format and a second list of objects in a second format different from the first format, and the bitmap data structure removes the need to maintain and process different bitmap data structures for the multiple heterogenous lists for reducing computational costs; and
        processing population counts for data and aggregating the population counts;
    wherein the bitmap data structure comprises a single fixed sized array periodically interleaved with a plurality of aggregated population count fields and a plurality of bitmap fields, a first end of the single fixed sized array appended along a first direction with one or more bit values corresponding to one or more objects of the first list of objects in the first format, a second end of the single fixed sized array opposite to the first end appended along a second direction opposite of the first direction with one or more other bit values corresponding to one or more objects of the second list of objects in the second format, and each aggregated population count field indicative of a number of objects from a start of the bitmap data structure up to the aggregated population count field that are in the first format.

2. The hardware accelerator of claim 1, wherein the multiple heterogenous lists represent a global list of objects in a plurality of different formats, the first list of objects represents a first local list of objects in the first format, the second list of objects represents a second local list of objects in the second format, and the single fixed array is a linear single fixed array.

3. The hardware accelerator of claim 2, wherein each local list comprises one or more objects in a single format, and the population counts are pre-computed.

4. The hardware accelerator of claim 3, wherein the bitmap data structure maintains the information for the multiple heterogenous lists as a repeated sequence of an aggregated population count field adjacent to a bitmap bit field.

5. The hardware accelerator of claim 1, wherein, in response to a selection of a bit position within the bitmap data structure for access, the bitmap processor determines a pre-computed population count within the bitmap data structure that is closest to the bit position selected for access, and adds to the determined closest pre-computed population count a population count of a number of particular bit values from a positon of the closest determined pre-computed population count to the bit position selected for access.

6. A method comprising:
at a hardware accelerator comprising a bitmap processor and a population count processor:
generating and processing a bitmap data structure, wherein the bitmap data structure comprises information for multiple heterogenous lists including a first list of objects in a first format and a second list of objects in a second format different from the first format, and the bitmap data structure removes the need to maintain and process different bitmap data structures for the multiple heterogenous lists, thereby reducing computational costs; and
processing population counts for data and aggregating the population counts;
wherein the bitmap data structure comprises a single fixed sized array periodically interleaved with a plurality of aggregated population count fields and a plurality of bitmap fields, a first end of the single fixed sized array appended along a first direction with one or more bit values corresponding to one or more objects of the first list of objects in the first format, a second end of the single fixed sized array opposite to the first end appended along a second direction opposite of the first direction with one or more other bit values corresponding to one or more objects of the second list of objects in the second format, and each aggregated population count field indicative of a number of objects from a start of the bitmap data structure up to the aggregated population count field that are in the first format.

7. The method of claim 6, further comprising:
at the hardware accelerator:
defining a bit lookup region of the bitmap data structure for passing an address and a maximum number of bit values to store, and for returning bytes needed;
appending to the bit lookup region by passing a bit value and maintaining an aggregate population count on a last word of the bitmap data structure;
inserting into the bit lookup region by passing an offset and a bit value for invalidating all aggregate population counts after an insert location;
triggering aggregation maintenance on a next bit lookup or based on an explicit instruction; and
looking up entries in the bit lookup region by using an offset for accessing both bit values of a plurality of bitmap bit fields and aggregate population counts of the aggregate population count fields.

8. The method of claim 6, wherein the multiple heterogenous lists represent a global list of objects in a plurality of different formats, the first list of objects represents a first local list of objects in the first format, the second list of objects represents a second local list of objects in the second format, and the single fixed array is a linear single fixed array.

9. The method of claim 8, wherein each local list comprises one or more objects in a single format, the population counts are pre-computed, and the bitmap data structure maintains the information for the multiple heterogenous lists as a repeated sequence of an aggregated population count field adjacent to a bitmap bit field.

10. The method of claim 6, further comprising:
at the hardware accelerator:
in response to a selection of a bit position within the bitmap data structure for access:
determining a pre-computed population count within the bitmap data structure that is closest to the bit position selected for access; and
adding to the determined closest pre-computed population count a population count of a number of particular bit values from a positon of the closest determined pre-computed population count to the bit position selected for access.

11. The method of claim 9, further comprising:
at the hardware accelerator:
forming a container based on the plurality of different formats;
appending one or more entries to the container; and
looking up one or more entries in the container by using an offset.

12. A computer program product comprising a non-transitory computer readable storage medium having program code embodied therewith, the program code readable/executable by a processor to:
at a hardware accelerator comprising a bitmap processor and a population count processor:
generating and processing a bitmap data structure, wherein the bitmap data structure comprises information for multiple heterogenous lists including a first list of objects in a first format and a second list of objects in a second format different from the first format, and the bitmap data structure removes the need to maintain and process different bitmap data structures for the multiple heterogenous lists, thereby reducing computational costs; and
processing population counts for data and aggregating the population counts;
wherein the bitmap data structure comprises a single fixed sized array periodically interleaved with a plurality of aggregated population count fields and a plurality of bitmap fields, a first end of the single fixed sized array appended along a first direction with one or more bit values corresponding to one or more objects of the first list of objects in the first format, a second end of the single fixed sized array opposite to the first end appended along a second direction opposite of the first direction with one or more other bit values corresponding to one or more objects of the second list of objects in the second format, and each aggregated population count field indicative of a number of objects from a start of the bitmap data structure up to the aggregated population count field that are in the first format.

13. The computer program product of claim 12, wherein the program code is further readable/executable by the processor to:
- define a bit lookup region of the bitmap data structure for passing an address and a maximum number of bit values to store, and for returning bytes needed;
- append to the bit lookup region by passing a bit value and maintaining an aggregate population count on a last word of the bitmap data structure;
- insert into the bit lookup region by passing an offset and a bit value for invalidating all aggregate population counts after an insert location;
- trigger aggregation maintenance on a next bit lookup or based on an explicit instruction; and
- look up entries in the bit lookup region by using an offset for accessing both bit values of a plurality of bitmap bit fields and aggregate population counts of the aggregate population count fields.

14. The computer program product of claim 13, wherein the multiple heterogenous lists represent a global list of objects in a plurality of different formats, the first list of objects represents a first local list of objects in the first format, the second list of objects represents a second local list of objects in the second format, and the single fixed array is a linear single fixed array.

15. The computer program product of claim 14, wherein each local list comprises one or more objects in a single format, the population counts are pre-computed, and the bitmap data structure maintains the information for the multiple heterogenous lists as a repeated sequence of an aggregated population count field adjacent to a bitmap bit field.

16. The computer program product of claim 12, wherein the program code is further readable/executable by the processor to:
- at the hardware accelerator:
  - in response to a selection of a bit position within the bitmap data structure for access:
    - determine a pre-computed population count within the bitmap data structure that is closest to the bit position selected for access; and
    - add to the determined closest pre-computed population count a population count of a number of particular bit values from a positon of the closest determined pre-computed population count to the bit position selected for access.

17. The computer program product of claim 15, wherein the program code is further readable/executable by the processor to:
- at the hardware accelerator:
  - form a container based on the plurality of different formats;
  - append one or more entries to the container; and
  - look up one or more entries in the container by using an offset.

* * * * *